July 18, 1967
S. B. JONES ETAL
3,331,268
CLAMP ACTUATING TOOL
Filed April 19, 1965
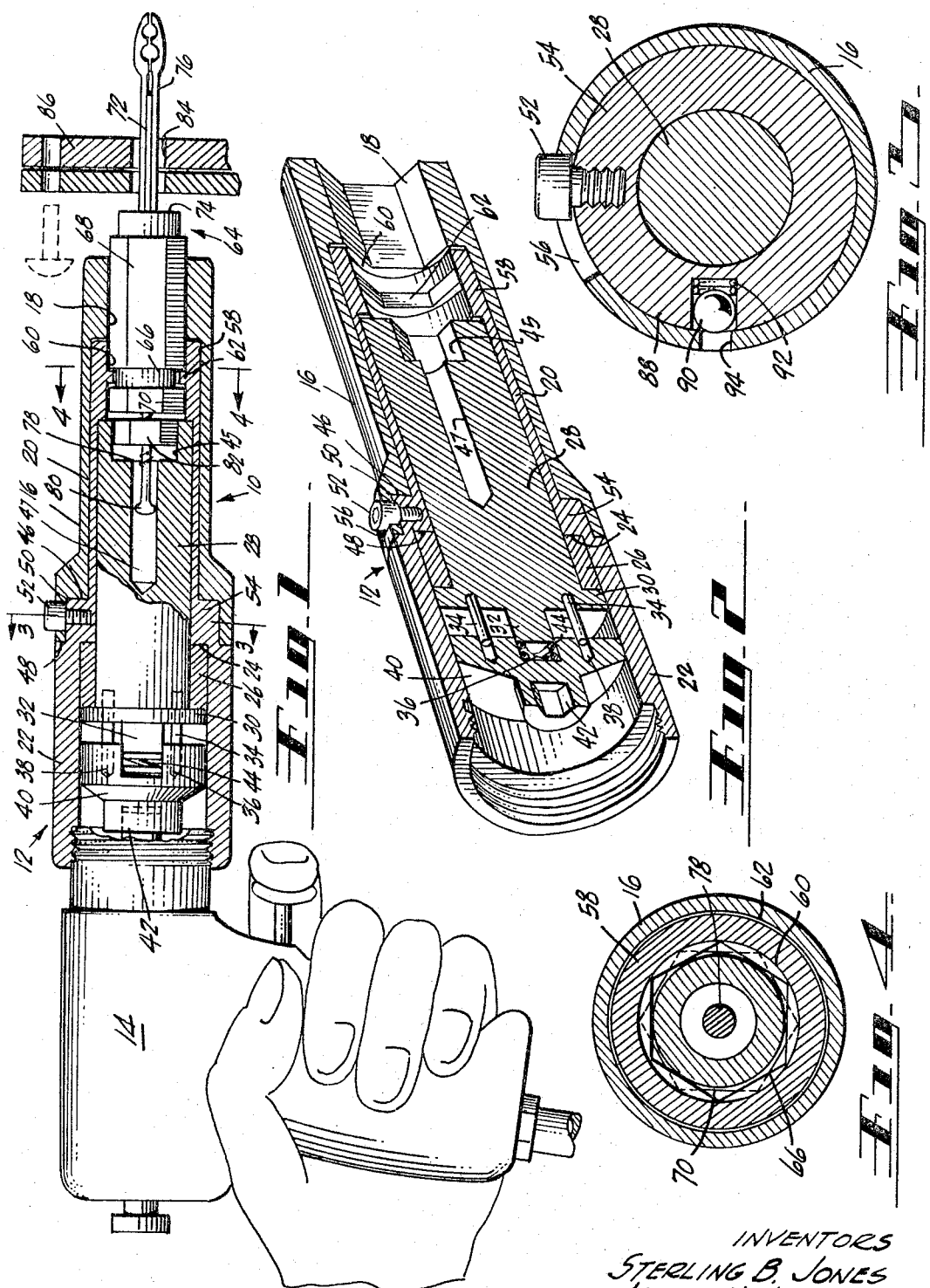
INVENTORS
STERLING B. JONES
JAMES H. LEE
BY Edwin Coates
-ATTORNEY-

CLAMP ACTUATING TOOL

Sterling B. Jones and James H. Lee, Torrance, Calif., assignors to Monogram Industries, Inc., Culver City, Calif.
Filed Apr. 19, 1965, Ser. No. 448,946
5 Claims. (Cl. 81—55)

The present invention lies in the field of tools for actuating axial, pin type clamps of the kind generally known as temporary skin fasteners, and is more particularly directed to such a tool which has integral, easily actuated means for locking it to a standard clamp to assist in inserting the clamp in the work and removing it therefrom.

The general type of clamp with which the tool is intended to be used is well known and is widely used, particularly in the aerospace industry. It usually includes an elongate base having a polygonal exterior surface for engagement by an operating tool. The forward end is closed except for a small aperture for the passage of a spreader bar and a pair of needles. The spreader bar is secured in the forward end of the base and extends axially and centrally through the passage. The needles are secured at their rear ends to a carrier slidably and non-rotatably mounted within the base.

The needles have outer shoulders and inner cams at their free ends and slide through the passage axially, one on each side of the spreader bar. When they are in their forward position, the cam portions approach each other sufficiently so that the shoulders will pass through openings in work pieces to be united. When the carrier and needles are moved rearwardly, the cams ride up on the spreader bar and the free ends separate enough so that the shoulders engage the remote face of the last work piece. Further movement rearwardly clamps the work pieces between the shoulders and the forward end of the base.

A screw shank is secured to the rear of the carrier and slides through a passage in the aft end of the base where it is engaged by a nut of any kind, usually one having a polygonal outer surface. When the nut is turned up on the shank, it retracts the carrier and needles. When the nut is backed off, the carrier and needles can be moved forwardly to the relaxed position where the total diameter of the free ends can again pass through the openings in the work pieces. It is at this point that difficulty often occurs because the slightest tendency of the work pieces to shift laterally with respect to each other causes them to bind on the needles. The force required to pull the clamp from the work pieces under these circumstances may be quite high and various special tools have been devised to aid in their removal. In one arrangement, an annular recess is formed in the surface of the clamp base intermediate the ends having a diameter equal to or less than the distance across flats and a tool having a fork shaped end engages the recess to pull the clamp rearwardly.

The actuating tool of the present invention is constructed with a built-in means to engage in said recess and lock the clamp in the tool so long as the operator desires to retain them together. The tool includes a main barrel, which is generally cylindrical, a drive element rotatably mounted within the barrel and carrying a socket to engage the nut of the clamp, and a sleeve rotatably mounted on the fore end of the barrel. Means are provided to limit the relative rotation of sleeve and barrel, preferably in the range of 10 to 30 degrees. The fore end of the sleeves is formed as a socket to slide on the clamp base and restrain it against rotation while the clamp is being tightened or released.

The fore end of the barrel bears a socket which is axially slightly shorter than the axial length of the recess and so positioned that when the tool is fitted over the clamp in operating position the barrel socket will be aligned with the recess. This latter socket is sized to fit the polygonal surface of the base. When the clamp is in proper position, the barrel is rotated with respect to the sleeve and the barrel socket will be angularly displaced, out of registry, so that its flats are axially aligned with the points of the base. In this condition the socket cannot move axially out of the recess, and the tool and clamp are locked together. Therefore the entire tool serves as a handle to pull the clamp out of the work pieces.

The foregoing is the primary function of the "lock-on" system but it serves other purposes as well. Ordinarily, the nut, when backed off, will merely travel rearwardly on the screw shank and the latter must then be driven forwardly by hammering on it with some heavy tool. However, in the present case, the socket on the drive element is shallow and, with the clamp locked in the tool, it restrains the nut against more than a small amount of rearward travel. Since the nut will not move rearwardly, the shank must move forwardly, thus freeing the needles from the spreader bar.

The "lock-on" feature is also desirable because the clamp can be initially secured in the actuating tool. This prevents it from falling out as the tool is moved about. When the work pieces are below the operator and in cramped quarters the tool thus serves as an extension to aid in locating the clamp in the desired position.

The tool is so constructed that there are no external protuberances in the driving section which could interfere with structure or with neighboring clamps in close quarters.

Various other advantages and features of novelty will become apparent as the description proceeds in conjunction with the accompanying drawing, in which:

FIGURE 1 is a side elevational view of the tool of this invention with parts broken away to show a clamp in operative position;

FIGURE 2 is a sectional view in perspective of the main body portion of the tool;

FIGURE 3 is a sectional view taken on line 3—3 of FIGURE 1; and

FIGURE 4 is a sectional view taken on line 4—4 of FIGURE 1.

The presently preferred form of actuating tool, or speedrunner, is generally illustrated in FIGURE 1, in which the tool 10 comprises a barrel 12, generally cylindrical in section, to the aft end of which is secured a drive motor 14 which may be electric but is preferably air operated. A sleeve 16, also generally cylindrical in section, overlies about one half of the forward portion of the barrel and extends some distance beyond its fore end. As can be best seen in FIGURE 2, the fore end of the sleeve terminates in an elongate socket 18 having a polygonal cross section to match the clamp with which it is to be used.

Barrel 12 is generally divided into a forward section 20 and a rear section 22, the latter being somewhat larger diametrically and being joined to the former by shoulder 24. A bearing ring 26 fits within section 22 and against shoulder 24 to form a bearing for drive element 28, which is elongate and generally cylindrical in section. The aft end of the drive element is formed with flange 30 to bear against bearing ring 26 to position the drive element axially in the barrel. The drive element is also provided at its aft end with a centering post 32 and drive pins 34 to cooperate with sockets 36 and 38 in adapter 40. The latter has a central polygonal socket 42 at its aft end for mounting on the end of the drive shaft of a drive motor.

Torque is transmitted from the adapter to drive element 28 through the pins 34 and sockets 38, which permit a slight longitudinal float of the drive element 28, always urged forwardly by spring 44 in socket 36. Any other suitable coupling can be used, such as a jaw clutch. The fore end of the drive element bears a shallow polygonal socket 45 to accept and drive the nut member of a pin type clamp, and a central deep recess or passage 47 is provided to loosely receive the screw shank of a clamp as the latter is tightened in a group of work pieces.

Barrel 12 is provided with a double step or shoulder 46, 48 externally at the juncture of forward section 20 and rearward section 22, and the aft end of sleeve 16 is enlarged and formed, as at 50, to rotatably fit on shoulder fit on shoulder 46, 48. A pin or post 52 is secured radially in the thick wall portion 54 of the barrel, and sleeve 16 is provided with a short circumferential slot 56 encompassing the post and permitting limited relative rotation between the sleeve and the barrel for a purpose to be described.

The fore end of barrel 12 terminates in a thickened wall portion 58 which is preferably cylindrical in section to provide a cylindrical passage 60 coaxial with socket 18 and large enough to freely receive the clamp which fits in socket 18. Formed in this passage is a locking shoulder having a central opening defining an axially short socket 62 of polygonal cross section identical to that of socket 18 so that both of them may fittingly slide on the clamp base. Socket 62 may be anywhere along the length of the passage, including the forward end, but is preferably at about the center as shown. In the relative position of the barrel and sleeve as seen in FIGURE 2, socket 62 is exactly in registry with socket 18, and both will readily encompass the polygonal surface of a clamp base. If the sleeve and barrel are relatively rotated to the positions of FIGURES 1, 3 and 4, then socket 62 will be out of registry with socket 18 by a predetermined amount and will be correspondingly out of registry with the formation on the clamp base.

Turning now to FIGURE 1, there is shown a clamp of the type with which the tool of this invention is intended to be used. Its base or main body 64 is polygonal, usually hexagonal, in external cross section to receive a socket type tool for restraining it against rotation on occasion. A recess 66 is formed in the external surface intermediate the ends, usually near the rear, dividing the base into fore and aft sections 68 and 70. The rear section 70 defines a thrust shoulder. The diameter of the recess is somewhat less than the distance across flats of the hexagon formations and, in the prior art system, a tool was provided with a fork like hook with tines straddling the recess, which tool could be pulled rearwardly to remove the clamp from the work.

The clamp shown is well known in the art. One variety is made and sold by Monogram Industries, Inc., of Culver City, Calif., and is identified as the "WNSD" clamp. Briefly its construction includes the hollow base 64 having a spreader bar 72 secured in its fore end and extending forwardly as shown, through a small aperture in the front wall 74. Needles 76 slide through the same opening on opposite sides of the spreader bar and have enlarged shoulders to engage the work piece and inner cam surfaces to engage the spreader bar. The rear ends of the needles are secured to a carrier, not shown, slidably and non-rotatably mounted within the base. Secured to the rear of the carrier is a screw shank 78 extending freely through an aperture in the rear wall of the base. The aft end of the screw shank is reduced in diameter below the thread roots and terminates in an enlarged stop 80. Nut 82 is threaded on the shank.

With the clamp in place as shown, the nut 82 is rotated by socket 45 and abuts the rear wall of the base, drawing shank 78 rearward, which in turn draws the carrier and the needles rearward. The cam surfaces of the needles ride up on the stationary spreader bar 72, thus moving the needles apart so that their enlarged heads cannot pass through opening 84 in workpiece 86. Continued retraction brings the shouldered heads of the needles against the remote face of work piece 86, and the assembly of two or more such pieces is clamped between the needle heads and front wall 74 of clamp base 64.

When it is desired to release the clamp from the work pieces, nut 82 is rotated in the reverse direction. If this is accomplished with the ordinary prior art tool, the nut will travel rearwardly along the shank until it spins free on the reduced section at the end of the shank. It is then necessary to push or hammer the end of the shank to force the needles to move forward to their relaxed position because they bind tightly in the holes in the work pieces. After this is done, it is then necessary to use some special tool to grip the clamp and pull it rearwardly out of the work. If the clamp is provided with a recess such as 66 in FIGURE 1, then a fork type tool as mentioned above may be used.

These disadvantages are overcome by the use of the present invention. With the sockets 62 and 18 in registry as seen in FIGURE 2, a clamp can be inserted until it reaches the position shown in FIGURE 1. In this position, socket 18 engages the front section 68 of base 64 and prevents its rotation. At the same time socket 45 of drive element 28 engages nut 82 to drive it in the selected direction and passage 47 receives the rear end of screw shank 78 to allow clearance for its rearward movement. While it is not essential to lock the clamp in the tool for tightening, it may be done if desired, particularly if the operator wishes to use the tool to support the clamp for locating it in the work.

To lock the clamp in the tool merely requires relative rotation of sleeve 16 and barrel 12 so that sockets 62 and 18 are out of registry. This can be done because socket 62 is now aligned with recess 66 in the clamp base. This places socket 62 out of registry with the formations on rear section 70 of the base as can be seen in FIGURE 4. Obviously, in this position, socket 62 is locked in the recess and the clamp cannot be moved forwardly or rearwardly except to the small extent of the clearance shown. Thus, if the tool is held with the forward end down, the clamp cannot fall out.

With the clamp locked as just described, reverse operation of the tool with back nut 82 off shank 78. However, the nut can move rearwardly only the short distance to the bottom of socket 45. Further rotation positively forces shank 78 forwardly and the needles are positively moved to the relaxed position shown in FIGURE 1. Because the needle sizes are selected to be a snug fit in hole 84 and similar holes in the other work pieces and more importantly because the work pieces frequently tend to shift relatively laterally, the needles are usually still tight in the holes and require substantial axial force to remove them. The tool is still locked on the clamp and hence the entire tool, including motor 14, serves as a handle for applying a pulling force on the clamp, and its becomes easy to remove it.

It is desirable to have the flats of socket 62 cross the points of section 70 as shown in FIGURE 4. This is facilitated by making slot 56, FIGURE 3, just long enough so that this position is attained when post 52 is at one end of the slot. When the post is at the other end of the slot, sockets 62 and 18 are in alignment for insertion and removal of the clamp. Means are provided to prevent inadvertent turning of the sleeve on the barrel from the "lock-on" position. These means take the form of a radial pocket 88 in section 54 of the barrel, in which is located a steel detent ball 90 backed up by a compression spring 92. With the parts in the position shown in FIGURE 3, the ball is urged outwardly into yielding locking engagement with aperture 94 in the wall of the barrel. If it is desired to yieldingly lock the barrel and sleeve in each of their extreme relative positions, it is only necessary to provide a second aperture 94 in the proper position to be engaged by the same detent ball 90.

Socket 62 is shown as being much shorter than socket 18 but this is not essential. Socket 62 can be any axial length which is less than the axial length of the recess in the clamp to be actuated. Thus, if the recess in some larger clamps is considerably longer than that shown in FIGURE 1, socket 62 might well be as long as socket 18. While the recess is usually substantially smaller in diameter than the distance across flats because of the lack of precise engagement of the prior art tools, it need be only as small as the distance across flats for the present tool because the socket is a precise fit over the formations on the clamp base and relies for its locking on interference with the points only, and not on engagement with the walls of the recess.

It will be apparent to those skilled in the art that various changes and modifications may be made in the construction as shown and described without departing from the spirit of the invention, and it is intended that all such changes and modifications shall be embraced within the scope of the following claims.

We claim:

1. A speedrunner to be driven by a motor for actuating an axial pin-type clamp including a forward generally tubular base and a rear relatively rotatable nut having external tool engaging formations and a rear external circumferential locking recess in said base defining a thrust shoulder rearwardly of the base formations, said runner comprising:

inner and outer relatively rotatable tubular members having front and rear ends;
coupling means on the rear end of one member for attachment to the housing of said motor;
a driving member rotatable within the rear end of said one member having front and rear ends and means at the rear end of said driving member for driving connection to the motor shaft;
said driving member having a forwardly opening socket at its front end for receiving said clamp nut and means about the wall of said socket engageable with said nut formations to restrain said driving member and nut against relative rotation;
the front end of said outer tubular member being located forwardly of said inner tubular member and having an open ended socket for receiving said clamp base and means about the wall of the latter socket engageable with said base formations to restrain said outer member and base against relative rotation;
said inner tubular member having an open ended socket intermediate said two first mentioned sockets for receiving said clamp base and means about the wall of said intermediate socket defining a locking shoulder disposed to register with said base locking recess when said clamp is located in actuating position in said sockets;
said tubular members being relatively rotatable between a locking position, wherein said locking shoulder is disposed for engagement in said base recess and for engagement with said base thrust shoulder to lock said tubular members and clamp base against relative axial movement, and an unlocking position, wherein said locking shoulder is disposed to clear said base thrust shoulder, thereby to permit axial insertion of said clamp into and removal of said clamp from said sockets; and
means connecting said tubular members for relative rotation thereof between said locking and unlocking positions and restraining said tubular members against relative axial movement.

2. A speedrunner according to claim 1 wherein:
said inner tubular member comprises a tubular barrel;
said outer tubular member comprises a sleeve surrounding and projecting forwardly of the front end of said barrel; and
said coupling means are on the rear end of said barrel.

3. A speedrunner according to claim 1 wherein:
said clamp nut has a polygonal cross section, said clamp base has a polygonal portion containing said locking recess, said recess divides said polygonal portion into front and rear polygonal extremities, and said rear polygonal extremity defines said base thrust shoulder;
said first mentioned runner socket is polygonal in cross section and sized to slidably receive said clamp nut;
said second mentioned runner socket is polygonal in cross section and sized to slidably receive said front polygonal extremity of said clamp base;
said runner locking shoulder has a polygonal opening sized to slidably receive said rear polygonal extremity of said clamp base; and
said shoulder opening and said second runner socket are aligned when said tubular members occupy said unlocking position and misaligned when said tubular members occupy said locking position.

4. A speedrunner according to claim 3 wherein:
said inner tubular member comprises a tubular barrel;
said outer tubular member comprises a sleeve surrounding and projecting forwardly of the front end of said barrel; and
said coupling means are on the rear end of said barrel.

5. A speedrunner according to claim 4 wherein:
said means connecting said tubular members comprise a circumferential slot in said sleeve and a stop member carried by said barrel and engaging in said slot;
said slot being circumferentially dimensioned to limit relative rotation of said barrel and sleeve between said locking and unlocking positions; and
coacting detent means on said barrel and sleeve for releasably locking said barrel and sleeve in said one locking position.

References Cited

UNITED STATES PATENTS

| | | | |
|---|---|---|---|
| 1,203,853 | 11/1916 | Contal | 279—90 |
| 2,789,597 | 4/1957 | La Torre | 81—55 |
| 3,041,902 | 7/1962 | Wing | 81—56 |
| 3,162,072 | 12/1964 | Stewart | 81—55 |

JAMES L. JONES, JR., *Primary Examiner.*